(12) United States Patent
Haari et al.

(10) Patent No.: US 9,429,043 B2
(45) Date of Patent: Aug. 30, 2016

(54) GASIFICATION POWER GENERATION PLANT

(75) Inventors: Kenta Haari, Tokyo (JP); Yasunari Shibata, Tokyo (JP); Yuichiro Kitagawa, Tokyo (JP); Osamu Shinada, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 847 days.

(21) Appl. No.: 13/641,771

(22) PCT Filed: May 19, 2011

(86) PCT No.: PCT/JP2011/061552
§ 371 (c)(1),
(2), (4) Date: Oct. 17, 2012

(87) PCT Pub. No.: WO2011/145690
PCT Pub. Date: Nov. 24, 2011

(65) Prior Publication Data
US 2013/0036720 A1 Feb. 14, 2013

(30) Foreign Application Priority Data
May 20, 2010 (JP) .................. 2010-116199

(51) Int. Cl.
*F02C 3/28* (2006.01)
*C10J 3/72* (2006.01)
(Continued)

(52) U.S. Cl.
CPC .............. *F01K 23/068* (2013.01); *C10J 3/466* (2013.01); *C10J 3/485* (2013.01); *C10J 3/726* (2013.01); *C10J 3/86* (2013.01); *F01K 13/02* (2013.01); *F02C 3/28* (2013.01); *F02C 6/18* (2013.01);
(Continued)

(58) Field of Classification Search
CPC .............. F02C 3/20; F02C 3/26; F02C 3/28; F02C 3/30; Y02E 20/18; C10J 3/726; C10J 3/86; F01K 23/068
See application file for complete search history.

(56) References Cited

U.S. PATENT DOCUMENTS 3,545,410 A * 12/1970 Crisp et al. .................... 122/7 R
3,686,867 A * 8/1972 Hull ................................ 60/667
(Continued)

FOREIGN PATENT DOCUMENTS

JP 10185104 A * 7/1998
JP 3676022 7/2005

OTHER PUBLICATIONS

English translation of Mase JP410185104A.*
(Continued)

*Primary Examiner* — Gerald L Sung
*Assistant Examiner* — Scott Walthour
(74) *Attorney, Agent, or Firm* — Wenderoth, Lind & Ponack, L.L.P.

(57) ABSTRACT

A gasifier (101) including a fluid communication channel (131) that communicates a fluid, which undergoes heat exchange in the furnace, and that generates syngas by gasifying fuel; gas purifying equipment that removes impurities contained in the syngas generated by the gasifier (101); a gas turbine that is driven by the gas purified by the gas purifying equipment; and a heat exchanger that heats a fluid with exhaust expelled from the gas turbine. The fluid heated by the heat exchanger is supplied to the fluid communication channel (131) by being pressurized by pressurizing gas when performing warm-up of the gasifier (101).

1 Claim, 2 Drawing Sheets

(51) Int. Cl.
*C10J 3/86* (2006.01)
*F01K 23/06* (2006.01)
*F01K 13/02* (2006.01)
*F02C 6/18* (2006.01)
*C10J 3/46* (2006.01)
*C10J 3/48* (2006.01)
*F02C 3/30* (2006.01)
*F02C 3/20* (2006.01)
*F02C 3/26* (2006.01)

(52) U.S. Cl.
CPC ... *C10J 2300/093* (2013.01); *C10J 2300/1671* (2013.01); *C10J 2300/1675* (2013.01); *C10J 2300/1884* (2013.01); *C10J 2300/1892* (2013.01); *F02C 3/20* (2013.01); *F02C 3/26* (2013.01); *F02C 3/30* (2013.01); *Y02E 20/16* (2013.01); *Y02E 20/18* (2013.01)

(56) References Cited

U.S. PATENT DOCUMENTS

| | | | | |
|---|---|---|---|---|
| 4,047,972 A | * | 9/1977 | Stumbar et al. | 134/2 |
| 4,955,190 A | * | 9/1990 | Robertson, Jr. | 60/780 |
| 6,237,542 B1 | * | 5/2001 | Nakajo et al. | 122/7 R |

OTHER PUBLICATIONS

Notice of Allowance issued Jan. 13, 2015 in corresponding Chinese Patent Application No. 201180021085.6.

Decision to Grant a Patent issued Dec. 17, 2013 in corresponding Japanese Patent Application No. 2010-116199.

International Search Report issued Jul. 19, 2011 in corresponding International Application No. PCT/JP2011/061552.

* cited by examiner

GASIFICATION POWER GENERATION PLANT

BACKGROUND OF THE INVENTION

1. Technical Field

The present invention relates to a gasification power generation plant, in particular, to warm-up operation of a gasifier.

2. Description of the Related Art

In coal gasification power generation plants in general, syngas is formed by gasifying coal in a gasifier, a gas turbine is driven by the generated syngas, and power is generated by a generator connected to the gas turbine. When the gasifier is started up by combusting startup fuel, such as diesel, natural gas, or the like, during startup operation of a coal gasification power generation plant, warm-up (warming) is performed to bring the interior of the gasifier to the dewpoint or above in order to prevent sulfur contained in syngas generated from the startup fuel from causing acid-dew-point corrosion in a wall, a coal economizer, an evaporator, and so forth that form the gasifier and to prevent dust in the syngas from becoming deposited thereon.

Japanese Patent Publication No. 3676022 discloses a technique in which warm-up is performed for the interior of the gasifier by using inert gas, serving as warm-up gas, and supply water heated by an exhaust-heat recovery boiler (hereinafter, referred to as "high-temperature water") is also circulated in the gasifier to perform the warm-up of the wall, the coal economizer, and the evaporator of the gasifier from the inside, thus reducing the warm-up operation time of the gasifier.

SUMMARY OF THE INVENTION

1. Technical Problem

However, with the invention disclosed in JP 3676022, in the case in which water at the wall, the coal economizer, and the evaporator of the gasifier is at low pressure when performing the warm-up of the gasifier, supplying the high-temperature water to a boiler-water circulation channel, which supplies water to the wall, the coal economizer, and the evaporator of the gasifier, may cause a flash phenomenon (depressurization boiling) in the boiler-water circulation channel, resulting in the occurrence of erosion and excessive flow speed. In order to prevent the occurrence of erosion and excessive flow speed, it is necessary to set an upper limit to the flow volume of the high-temperature water supplied to the boiler-water circulation channel, and thus, there is a problem in that the warm-up time of the gasifier cannot be reduced and the operating efficiency of the coal gasification power generation plant cannot be enhanced.

The present invention has been conceived in light of the above-described circumstances, and an object thereof is to provide a gasification power generation plant in which the warm-up time of a gasifier can be reduced.

2. Solution to the Problem

In order to solve the above-described problems, a gasification power generation plant of the present invention employs the following solutions.

A gasification power generation plant according to the present invention is provided with a gasifier that has a fluid communication channel that communicates fluid that exchanges heat with the interior of the gasifier and that generates syngas by gasifying fuel; gas purifying equipment that removes impurities from the syngas generated by the gasifier; a gas turbine that is driven by the gas purified by the gas purifying equipment; and a heat exchanger that heats fluid with exhaust expelled from the gas turbine, wherein the fluid heated by the heat exchanger is supplied to the fluid communication channel to which fluid pressurized by pressurizing gas is guided when the warm-up of the gasifier is performed.

As a result, the flash phenomenon that occurs in the fluid communication channel can be prevented by supplying the pressurized fluid and the heated fluid to the fluid communication channel when warm-up of the gasifier is performed, and the heated fluid can be supplied to the fluid communication channel without reducing the supply volume thereof. Therefore, the warm-up time of the gasifier can be reduced, and the operating efficiency of the gasification power generation plant can be enhanced.

During the startup operation of the gasification power generation plant, startup fuel is separately supplied to the gas turbine. The startup operation of the gas turbine is started in this way, and, because the pressurized fluid and the heated fluid are supplied to the fluid communication channel when the warm-up of the gasifier is performed in this invention, it becomes possible to reduce the warm-up time of the gasifier, and the syngas can be supplied to the gas turbine at an early stage by generating it in the gasifier. Therefore, it is possible to reduce the consumption of the startup fuel for the gas turbine, and it is possible to reduce costs during the startup operation of the gasification power generation plant.

With a gasification power generation plant according to a first aspect of the present invention, the pressurized fluid is pressurized to or above a saturated pressure of the heated fluid.

By supplying the fluid pressurized to or above the saturated pressure to the fluid communication channel via the gas region, the fluid in the fluid communication channel can be prevented from reaching an excessive flow speed due to merging of the pressurized fluid and the heated fluid. Accordingly, the need to limit the supply volume of the heated fluid is eliminated, and the upper limit of the supply volume thereof can be increased. Therefore, the operating efficiency of the gasification power generation plant can be enhanced by reducing the warm-up time of the gasifier.

With a gasification power generation plant according to a second aspect of the present invention, the fluid communication channel has a fluid region and a gas region; and the pressurizing gas is supplied to the gas region.

By pressurizing the fluid in the fluid region of the fluid communication channel by supplying the pressurizing gas to the gas region of the fluid communication channel, the fluid in the fluid communication channel can be prevented from reaching an excessive flow speed when the pressurized fluid and the heated fluid are merged. Accordingly, the need to limit the supply volume of the heated fluid is eliminated, and the upper limit of the supply volume can be increased. Therefore, the operating efficiency of the gasification power generation plant can be enhanced by reducing the warm-up time of the gasifier.

With a gasification power generation plant according to a third aspect of the present invention, the pressurizing gas is a non-condensable gas.

The fluid that merges with the heated fluid is pressurized by employing a non-condensable gas. In addition, the non-condensable gas does not condense to form drain liquid. Accordingly, warm-up of the gasifier can be performed while maintaining the fluid guided to the fluid communication channel at or above the saturated pressure. Therefore, the operating efficiency of the gasification power generation plant can be enhanced by reducing the warm-up time of the gasifier.

3. Advantageous Effects of the Invention

Because pressurized fluid and heated fluid are supplied to a fluid communication channel when warm-up of the gasifier is performed, it is possible to prevent a flash phenomenon that occurs in the fluid communication channel. Accordingly, because the heated fluid can be supplied to the fluid communication channel without reducing the supply volume of the heated fluid, it becomes possible to reduce the warm-up time of the gasifier. In addition, by reducing the warm-up time of the gasifier, the operating efficiency of the gasification power generation plant can be enhanced, and it also becomes possible to generate syngas at the gasifier and supply it to a gas turbine at an early stage. Therefore, it is possible to reduce the consumption of startup fuel for the gas turbine, and thus, it is possible to reduce costs during the startup operation of the gasification power generation plant.

DETAILED DESCRIPTION OF THE INVENTION

Figure 1:
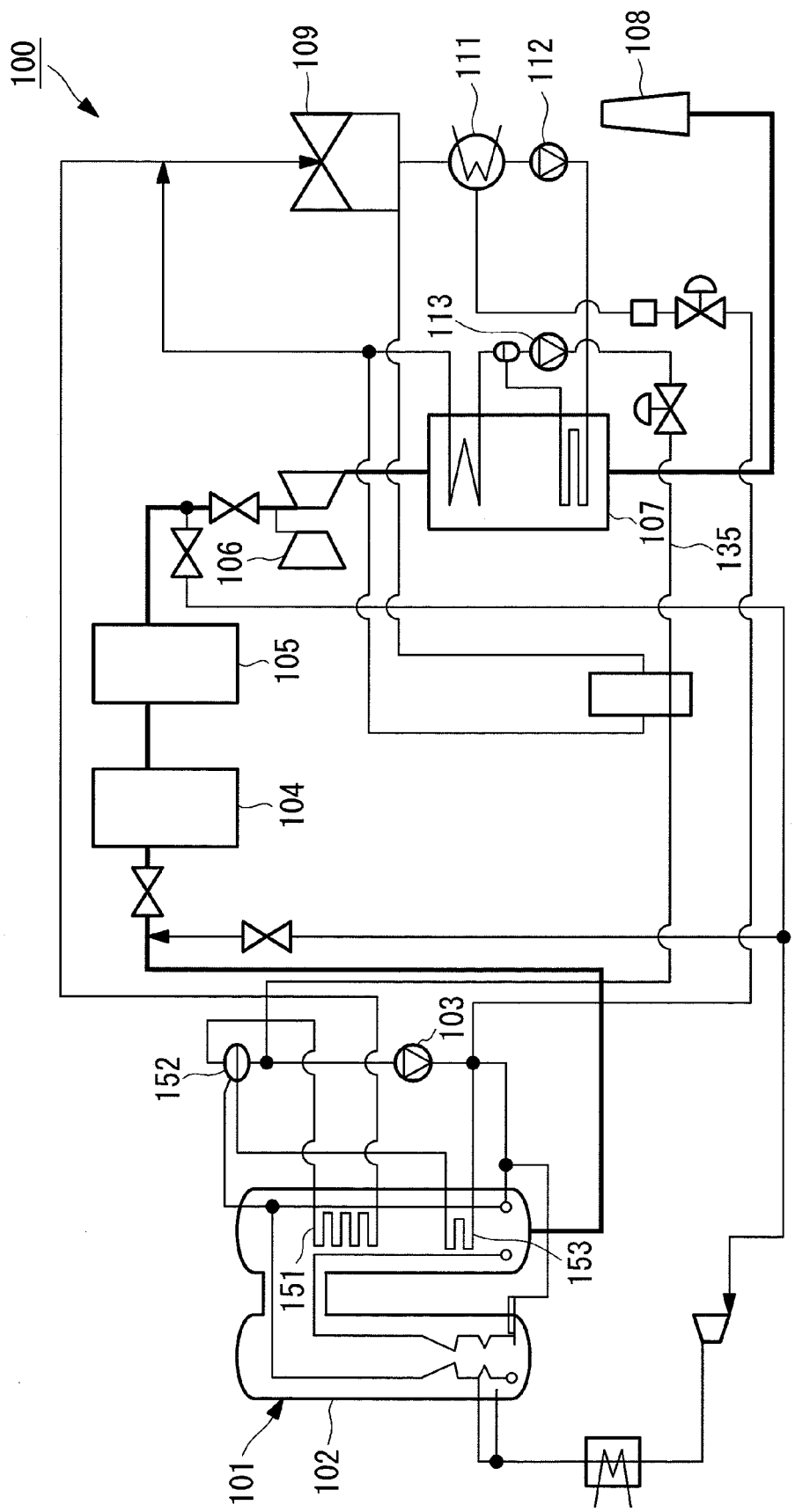
FIG. 1 is a schematic configuration diagram of an integrated coal gasification combined cycle plant according to an embodiment of the present invention.

FIG. 1 shows a schematic configuration diagram of an integrated coal gasification combined cycle plant according to an embodiment of the present invention.

As shown in FIG. 1, an integrated coal gasification combined cycle plant (IGCC: Integrated Coal Gasification Combined Cycle) 100 that uses coal as fuel is mainly provided with a coal gasifier (gasifier) 101 that gasifies coal (fuel); gas purifying equipment (not shown) that removes dust and sulfur from syngas gasified by the coal gasifier 101; a gas turbine 106 that is driven by combusting purified gas purified by the gas purifying equipment; an exhaust-heat recovery boiler (heat exchanger) 107 that recovers heat of discharged gas (exhaust) expelled from the gas turbine 106; a steam turbine 109 to which steam generated by the exhaust-heat recovery boiler 107 is guided; and a generator (not shown) that is driven by the gas turbine 106 and the steam turbine 109.

The coal gasifier 101 generates syngas by gasifying coal, which is fuel supplied via a coal supply pathway (not shown). In addition, the coal gasifier 101 generates steam by causing water (fluid) to flow in a water pipe 154 (see FIG. 2) provided at a wall portion thereof. In this example, the coal gasifier 101 is a so-called forced-circulation boiler that has coal-gasifier circulation water pumps 103 (only one of them is shown in FIG. 1).

The coal gasifier 101 is provided with a coal gasification portion (not shown) that is formed on the upstream side of the coal gasifier 101 so that the syngas produced therein is guided from bottom to top, as well as an evaporator 151, a superheater (not shown), and a coal economizer 153, which are connected on the downstream side of the coal gasifier 101 in the order in which the syngas is guided therethrough from the upstream side to the downstream side. The syngas exchanges heat at each of the evaporator 151, the superheater, and the coal economizer 153 when passing through the evaporator 151, the superheater, and the coal economizer 153. The coal gasification portion is accommodated in a coal-gasifier pressure container 102 together with the evaporator 151, the superheater, and the coal economizer 153. Accordingly, the syngas is prevented from flowing outside the coal-gasifier pressure container 102.

The coal gasification portion is provided, from below, with a combustor (not shown) and a reductor (not shown). The combustor combusts coal and a portion of char. Although an entrained bed is employed in the combustor, a fluidized bed or a fixed bed may be employed.

The combustor and the reductor are provided with a combustor burner (not shown) and a reductor burner (not shown), respectively. Coal is supplied to these burners from the coal supply pathway.

Air compressed by a compressor (not shown) of the gas turbine 106, described later, is supplied to the combustor burner. Specifically, the integrated coal gasification combined cycle plant (gasification power generation plant) 100 of this embodiment is a so-called air-blown type. Note that the air supplied from the compressor of the gas turbine 106 is employed as a gasification agent.

The reductor gasifies coal by high-temperature gas guided from the combustor. Accordingly, combustible syngas, such as carbon monoxide, hydrogen, or the like, is produced from coal. The coal gasification reaction is an endothermic reaction in which carbon in coal and char reacts with carbon dioxide and water in the high-temperature gas to produce carbon monoxide and hydrogen.

Water is supplied to the evaporator 151 from the coal-gasifier circulation water pump 103. The water supplied to the evaporator 151 is turned into steam by undergoing heat exchange with the high-temperature syngas guided from the reductor and is guided to a coal-gasifier steam drum 152, which is a gas-liquid separator and also has a gas region 152a and a water region (fluid region) 152b.

An area in the coal-gasifier steam drum 152 that has water is referred to as the water region and an area thereof that does not have water is referred to as the gas region Steam generated due to separation of water in the coal-gasifier steam drum 152 is guided to the superheater. The steam guided to the superheater is turned into superheated steam by undergoing heat exchange with the high-temperature syngas and is guided to the steam turbine 109.

Water whose pressure is increased by a high-pressure water supply pump 113 is supplied to the coal economizer 153. The temperature of the water supplied to the coal economizer 153 is increased by undergoing heat exchange with the syngas whose temperature has decreased by releasing heat to the evaporator 151 and the superheater. The water whose temperature has been increased is guided to the coal-gasifier steam drum 152.

The syngas whose temperature has decreased by passing through the evaporator 151, the superheater, and the coal economizer 153 contains dust and sulfur compounds, such as hydrogen sulfide or carbonyl sulfide, which are impurities, and the syngas containing dust and sulfur compounds is guided to the gas purifying equipment from the coal gasifier 101. The gas purifying equipment is provided with a dust remover 104 and a desulfurization device 105.

The dust remover 104 removes dust, which is an impurity in the syngas. The desulfurization device 105 removes sulfur compounds, which are impurities in the syngas. The syngas is guided to the gas turbine 106 in the form of clean purified gas that has been purified by being subjected to dust removal and desulfurization by the dust remover 104 and the desulfurization device 105.

The purified gas guided to the gas turbine 106 is sent first to a combustor (not shown) provided in the gas turbine 106. The gas turbine 106 is provided with the combustor, a turbine (not shown) that is driven by exhaust gas combusted by the combustor, and a compressor (not shown) that sends high-pressure air to the combustor.

At the combustor, the purified gas and air guided thereto are combusted and the exhaust gas (exhaust) is discharged. The exhaust gas discharged from the combustor is guided to the turbine and rotationally drives the turbine. By causing the turbine to be rotationally driven by the exhaust gas, a rotating shaft (not shown) connected to the turbine is rotated. The compressor is connected to the rotating shaft which is rotated, and, by causing the rotating shaft to be rotated, the compressor is rotationally driven to compress air. The air compressed by the compressor is guided to the combustor and the coal gasifier 101. In addition, because the generator is connected to the rotating shaft, by causing the rotating shaft to rotate, the generator is driven to generate power.

The exhaust gas that has rotationally driven the gas turbine 106 is guided to the exhaust-heat recovery boiler 107. The exhaust-heat recovery boiler 107 generates superheated steam with the heat of the exhaust gas guided thereto from the gas turbine 106. The exhaust gas from which heat has been recovered at the exhaust-heat recovery boiler 107 is discharged outside the integrated coal gasification combined cycle plant 100 from a chimney 108.

The superheated steam generated at the exhaust-heat recovery boiler 107 is guided to the steam turbine 109. In addition, superheated steam is guided to the steam turbine 109 from the above-described coal-gasifier steam drum 152 and the superheater. The steam turbine 109 is connected to the same rotating shaft as the gas turbine 106 is, forming a so-called single-shaft combined system. Note that, without limitation to the single-shaft combined system, a multiple-shaft combined system may be employed.

The driving force for the rotating shaft being driven by the gas turbine 106 is further increased by the steam guided to the steam turbine 109. Accordingly, the power generation level of the generator connected to the rotating shaft is increased.

The steam that has rotationally driven the steam turbine 109 is guided to a condenser 111. The steam guided to the condenser 111 is cooled by seawater to be returned to water (condensed water). The condensed water is supplied to the exhaust-heat recovery boiler 107 by a low-pressure water supply pump 112 to be turned into high-temperature water by the exhaust gas guided to the exhaust-heat recovery boiler 107. A portion of the high-temperature water is supplied to a boiler-water circulation pathway 131 (see FIG. 2), described later, as warming supply water (heating fluid) 135 by the high-pressure water supply pump 113, and the remainder thereof is guided to the exhaust-heat recovery boiler 107 again to be turned into superheated steam.

Next, the warm-up method of the coal gasifier will be described by using FIG. 2.

Figure 2:
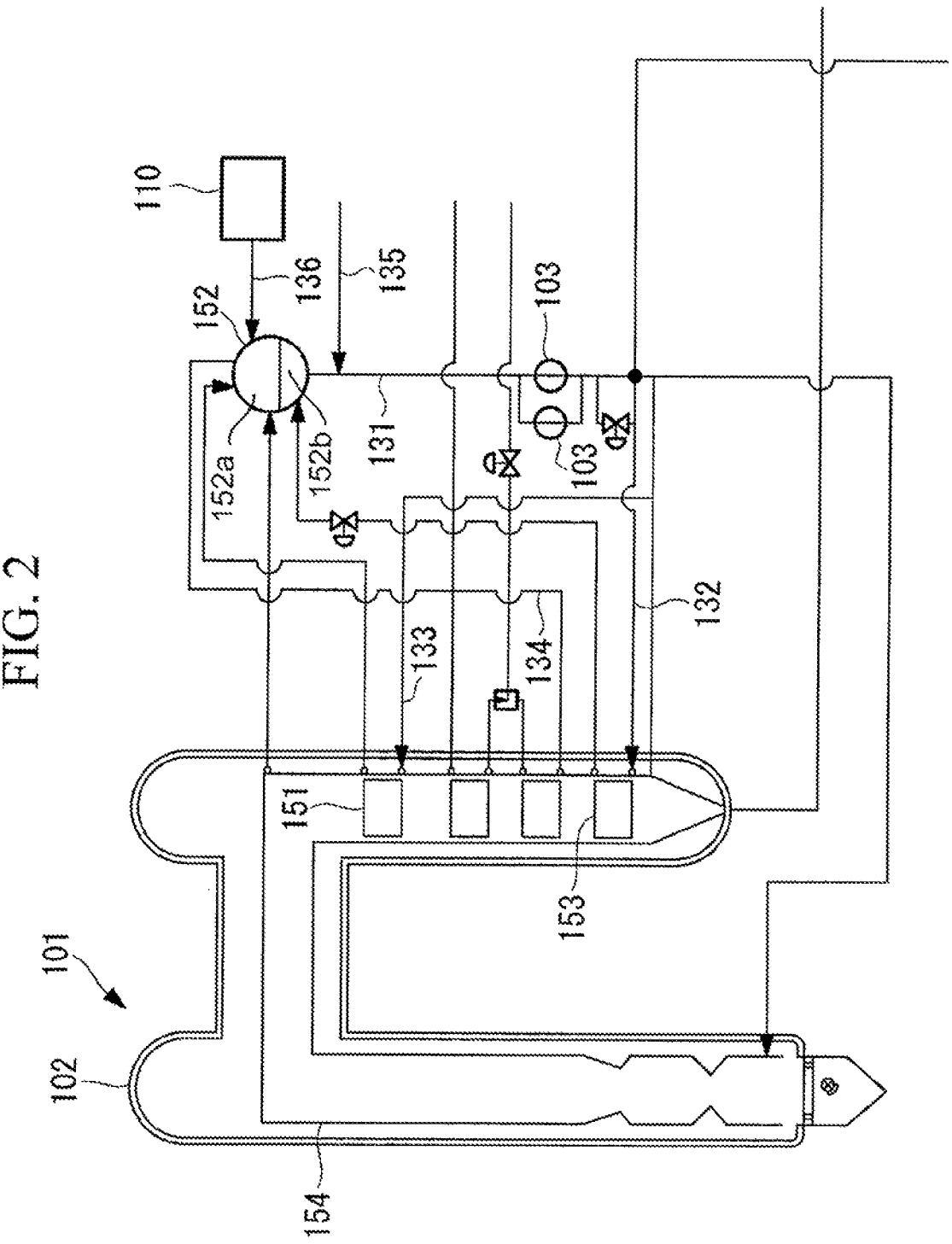
FIG. 2 is a schematic configuration diagram of a warm-up system of a coal gasifier shown in FIG. 1.

FIG. 2 shows a warm-up system of the coal gasifier.

The warm-up system of the coal gasifier 101 is provided with the boiler-water circulation pathway (fluid communication channel) 131 that guides water to the water pipe 154 provided at the wall portion of the coal gasifier 101 from the coal-gasifier steam drum 152; a superheater inlet pipe 134 that guides the steam generated at the coal-gasifier steam drum 152 to the superheater (not shown); a coal-economizer circulation pathway 132 that guides water that is branched off from a portion of the boiler-water circulation pathway 131 to the coal economizer 153; and an evaporator circulation pathway 133 that guides water that is additionally branched off from a portion of the boiler-water circulation pathway 131 to the evaporator 151.

In addition, the warm-up supply water (hereinafter, referred to as "warming supply water") 135 which is guided from a portion of the above-described exhaust-heat recovery boiler 107 (see FIG. 1), heated to, for example, about 100° C., merges with the boiler-water circulation pathway 131 connected to the coal-gasifier steam drum 152. The pressure of the water in the boiler-water circulation pathway 131 with which the warming supply water (heating fluid) 135 has merged is increased by the coal-gasifier circulation water pump 103. The water whose pressure has been increased is supplied to the water pipe 154, the coal economizer 153, and the evaporator 151 that are provided in the coal gasifier 101 via the boiler-water circulation pathway 131, as well as the coal-economizer circulation pathway 132 and the evaporator circulation pathway 133 that are branched off from the boiler-water circulation pathway 131.

Note that the superheater inlet pipe 134 connected to the coal-gasifier steam drum 152 supplies the superheater with saturated steam, which is generated in the coal-gasifier steam drum 152 through gas-liquid separation of water.

In the case in which the startup of the integrated coal gasification combined cycle plant 100 (see FIG. 1) is stopped, the pressure of water in the boiler-water circulation pathway 131 is at low pressure. Because of this, a flashing phenomenon occurs in the boiler-water circulation pathway 131 if the warming supply water 135 whose temperature is 100° C. is merged with the low-pressure water in the boiler-water circulation pathway 131 led out from the coal-gasifier steam drum 152 during the startup operation of the integrated coal gasification combined cycle plant 100.

Therefore, nitrogen gas (pressurizing gas) generated from the air by an air separator 110 provided in the integrated coal gasification combined cycle plant 100 is supplied, through the gas-supply pathway 136, to the gas region in the coal-gasifier steam drum 152, in which low-temperature water (of about atmospheric temperature to about 80° C.) is stored. By guiding the nitrogen gas to the gas region in the coal-gasifier steam drum 152 at a high pressure, the interior of the coal-gasifier steam drum 152 is pressurized to about 4 MPa to 10 MPa.

By pressurizing the interior of the coal-gasifier steam drum 152, the water in the coal-gasifier steam drum 152 is brought to a high pressure greater than the saturated pressure of the warming supply water 135. Accordingly, it is possible to prevent the occurrence of a flashing phenomenon in the boiler-water circulation pathway 131 even in the case in which the pressurized low-temperature water (pressurized fluid) in the coal-gasifier steam drum 152 is led out to the boiler-water circulation pathway 131 and merged with the high-temperature warming supply water 135.

By suppressing the flashing phenomenon in this way, it is possible to supply water whose temperature is increased (to about 250° C. to about 350° C.) to the coal-economizer circulation pathway 132 and the evaporator circulation pathway 133 from the boiler-water circulation pathway 131 without reducing the flow volume of the warming supply water 135 that is merged with the boiler-water circulation pathway 131, and, furthermore, the warm-up of the coal gasifier 101 can be performed from inside by supplying the water whose temperature is increased to the water pipe 154, the coal economizer 153, and the evaporator 151 from the boiler-water circulation pathway 131, the coal-economizer circulation pathway 132, and the evaporator circulation pathway 133.

Next, a method for the startup operation of the integrated coal gasification combined cycle plant will be described.

Startup fuel, such as petroleum or the like, is supplied to the combustor of the gas turbine 106 (see FIG. 1), and the gas turbine 106 is started up with the exhaust gas generated by combusting the startup fuel supplied to the combustor. The exhaust gas expelled from the combustor of the gas turbine 106 is supplied to the exhaust-heat recovery boiler 107 and heats water supplied from a water-supply system channel (not shown), thus generating high-temperature water and steam. The steam generated at the exhaust-heat recovery boiler 107 is guided to the steam turbine 109. By doing so, the steam turbine 109 is started up.

A portion of the high-temperature water generated at the exhaust-heat recovery boiler 107 is extracted from the exhaust-heat recovery boiler 107 and the pressure thereof is increased by the high-pressure water supply pump 113. The high-temperature water whose pressure has been increased is supplied to the boiler-water circulation pathway 131 (see FIG. 2) as the warming supply water 135, and, as described above, warm-up of the coal gasifier 101 is performed by the warming supply water 135 supplied to the boiler-water circulation pathway 131 and the water pressurized by the coal-gasifier steam drum 152.

As has been described above, the integrated coal gasification combined cycle plant 100 is started up by performing warm-up of the individual devices in the integrated coal gasification combined cycle plant 100.

As described above, the integrated coal gasification combined cycle plant according to this embodiment affords the following operational advantages.

When performing warm-up of the coal gasifier (gasifier) 101, the nitrogen gas (pressurizing gas) is supplied to the gas region of the coal-gasifier steam drum 152, and the low-temperature water (pressurized fluid) pressurized to or above the saturated pressure of the warming supply water (heating fluid) 135 and the warming supply water 135 are supplied to the boiler-water circulation pathway (fluid communication channel) 131. By doing so, it is possible to prevent the flash phenomenon and the excessive flow speed that occur when the pressurized water and the warming supply water 135 merge with the boiler-water circulation pathway 131. Accordingly, the warming supply water 135 can be supplied to the boiler-water circulation pathway 131 without reducing the supply volume thereof. Therefore, it becomes possible to reduce the warm-up time of the coal gasifier 101, and because the operating efficiency of the integrated coal gasification combined cycle plant (gasification power generation plant) 100 can be enhanced and because the syngas can also be supplied to the gas turbine 106, at an early stage by generating it at the coal gasifier 101, it is possible to reduce the consumption of the startup fuel for the gas turbine 106 and it is possible to reduce costs during the startup operation of the integrated coal gasification combined cycle plant 100.

In addition, because the nitrogen gas (non-condensable gas) that pressurizes the water that merges with the warming supply water 135 does not condense to form drain liquid, warm-up of the coal gasifier 101 can be performed while maintaining the water guided to the boiler-water circulation pathway 131 at or above the saturated pressure of the warming supply water 135. Therefore, the operating efficiency of the integrated coal gasification combined cycle plant 100 can be enhanced by reducing the warm-up time of the coal gasifier 101.

Note that although this embodiment has been described assuming that nitrogen gas is employed, the present invention is not limited thereto, and gas that is non-condensable as well as non-corrosive may be employed.

In addition, although descriptions have been given assuming that the nitrogen gas separated by the air separator 110 is employed, a device for generating nitrogen gas may be provided separately.

Furthermore, although descriptions have been given assuming that the nitrogen gas is supplied to the coal-gasifier steam drum 152, it may be supplied to portions having gas regions in a pathway that reaches the coal-gasifier steam drum 152 from the boiler-water circulation pathway 131, the coal-economizer circulation pathway 132, and the evaporator circulation pathway 133 via the water pipe 154, the coal economizer 153, and the evaporator 151, as well as in a pathway that reaches the steam turbine 109 from the coal-gasifier steam drum 152 via the superheater inlet pipe 134.

REFERENCE SIGNS LIST

100 integrated coal gasification combined cycle plant (gasification power generation plant)
101 coal gasifier (gasifier)
102 coal-gasifier pressure container
103 coal-gasifier circulation water pump
104 dust remover
105 desulfurization device
106 gas turbine
107 exhaust-heat recovery boiler (heat exchanger)
108 chimney
109 steam turbine
110 air separator
111 condenser
112 low-pressure water supply pump
113 high-pressure water supply pump
131 boiler-water circulation channel (fluid communication channel)
132 coal-economizer circulation pathway
133 evaporator circulation pathway
134 superheater inlet pipe
135 warming supply water (heating fluid)
136 gas supply pathway
151 evaporator
152 coal-gasifier steam drum
152*a* gas region
152*b* water region (fluid region)
153 coal economizer
154 water pipe

The invention claimed is:

1. A gasification power generation plant comprising:
a gasifier that generates syngas by gasifying fuel, the gasifier including a communication channel that communicates water to an interior of the gasifier to undergo heat exchange with the generated syngas;
gas purifying equipment connected to the gasifier so as to receive syngas generated by the gasifier and remove impurities from the syngas;
a gas turbine connected to the gas purifying equipment, wherein the gas turbine is driven by the syngas purified by the gas purifying equipment;
a heat exchanger connected to the gas turbine such that the heat exchanger heats water with gas exhausted from the gas turbine, wherein a downstream side of the heat exchanger is connected to the communication channel so that at least a portion of the heated water can be supplied to the communication channel;

a gas-liquid separator connected to the communication channel, the gas-liquid separator having a water region connected to the communication channel and a gas region; and a non-condensable pressurizing gas supplier connected to the gas region of the gas-liquid separator to pressurize an interior of the gas-liquid separator, the non-condensable pressurizing gas supplier being capable of pressurizing water in the water region of the gas-liquid separator to or above a saturated pressure of the heated water when the heated water is at a temperature of about 250° C., wherein water in the water region of the gas-liquid separator is received by the communication channel, wherein in a case where a warm-up of the gasifier is performed, the non-condensable pressurizing gas supplier supplies non-condensable pressurizing gas to the gas region of the gas-liquid separator, the gas-liquid separator guides the water pressurized by the non-condensable pressurizing gas to the communication channel, and the heat exchanger supplies the water heated by the heat exchanger to the communication channel.

* * * * *